(12) United States Patent
Bauer et al.

(10) Patent No.: US 7,377,548 B2
(45) Date of Patent: May 27, 2008

(54) ADAPTIVE DEPTH AIRBAG

(75) Inventors: Barney J. Bauer, Rochester, MI (US);
James Karlow, Milford, MI (US); **Amy
L. Klinkenberger**, Highland, MI (US);
John K. Williamson, Columbia, MO
(US)

(73) Assignee: TK Holdings Inc., Auburn Hills, MI
(US)

( * ) Notice: Subject to any disclaimer, the term of this
patent is extended or adjusted under 35
U.S.C. 154(b) by 203 days.

(21) Appl. No.: 11/192,411

(22) Filed: Jul. 29, 2005

(65) Prior Publication Data

US 2006/0249943 A1 Nov. 9, 2006

Related U.S. Application Data

(60) Provisional application No. 60/678,193, filed on May 6, 2005.

(51) Int. Cl.
*B60R 21/16* (2006.01)
(52) U.S. Cl. .................................................. 280/743.2
(58) Field of Classification Search ............. 280/743.2, 280/743.1, 730.2
See application file for complete search history.

(56) References Cited

U.S. PATENT DOCUMENTS

| | | | |
|---|---|---|---|
| 3,756,620 A | 9/1973 | Radke | |
| 5,308,113 A | 5/1994 | Moriset | |
| 5,395,134 A | 3/1995 | Gunn et al. | |
| 5,558,365 A | 9/1996 | Oe et al. | |
| 5,609,363 A | 3/1997 | Finelli | |
| 5,676,395 A | 10/1997 | Oe et al. | |
| 5,803,495 A | 9/1998 | Jackson et al. | |
| 5,871,231 A | 2/1999 | Richards et al. | |
| 5,997,037 A | 12/1999 | Hill et al. | |
| 6,076,854 A | 6/2000 | Schenck et al. | |
| 6,254,130 B1 | 7/2001 | Jayaraman et al. | |
| 6,334,627 B1 | 1/2002 | Heym et al. | |
| 6,390,501 B1 | 5/2002 | Greib et al. | |
| 6,419,268 B1 * | 7/2002 | Webert | 280/743.2 |

(Continued)

FOREIGN PATENT DOCUMENTS

GB 2 343 420 A 5/2000

(Continued)

OTHER PUBLICATIONS

Research Disclosure Document No. 467067, "Tension Methods for Curtain Airbag", Mar. 2003, 3 pgs.

(Continued)

*Primary Examiner*—Faye M. Fleming
(74) *Attorney, Agent, or Firm*—Foley & Lardner LLP

(57) ABSTRACT

An airbag device includes an airbag formed with at least one fabric panel and an inflator. The fabric panel includes at least one loop along a perimeter of the fabric panel. The inflator is a dual stage inflator configured to generate inflation gas during a first inflation stage and a second inflation stage to inflate the airbag. The airbag also includes a tether configured to help control the shape of the airbag when the airbag is inflating, the tether being positioned through the opening or loop when the airbag is in an uninflated state. The tether is severed by heat and/or pressure from inflation gases during the second stage inflation.

21 Claims, 12 Drawing Sheets

U.S. PATENT DOCUMENTS

| | | |
|---|---|---|
| 6,422,597 B1 | 7/2002 | Pinsenschaum et al. |
| 6,428,042 B1 | 8/2002 | Fischer et al. |
| 6,454,300 B1 | 9/2002 | Dunkle et al. |
| 6,505,853 B2 * | 1/2003 | Brannon et al. ......... 280/730.2 |
| 6,511,094 B2 | 1/2003 | Thomas et al. |
| 6,513,835 B2 | 2/2003 | Thomas |
| 6,561,545 B2 | 5/2003 | Greib et al. |
| 6,565,114 B1 | 5/2003 | Thomas |
| 6,592,146 B2 | 7/2003 | Pinsenschaum et al. |
| 6,598,903 B2 | 7/2003 | Okada et al. |
| 6,616,184 B2 | 9/2003 | Fischer |
| 6,634,671 B2 * | 10/2003 | Heigl et al. .............. 280/743.2 |
| 6,648,371 B2 * | 11/2003 | Vendely et al. ............. 280/739 |
| 6,749,217 B2 | 6/2004 | Damian et al. |
| 6,808,205 B2 * | 10/2004 | Hawthorn et al. ........ 280/743.2 |
| 6,811,183 B1 | 11/2004 | Serban et al. |
| 6,832,778 B2 | 12/2004 | Pinsenschaum et al. |
| 6,883,831 B2 | 4/2005 | Hawthorn et al. |
| 6,886,858 B2 | 5/2005 | Olson |
| 6,932,385 B2 | 8/2005 | Hawthorn et al. |
| 7,125,039 B2 * | 10/2006 | Bossecker et al. ....... 280/730.2 |
| 2001/0035639 A1 | 11/2001 | Amamori |
| 2002/0175511 A1 | 11/2002 | Dunkle et al. |
| 2003/0234520 A1 | 12/2003 | Hawthorn et al. |
| 2004/0041384 A1 | 3/2004 | Drechsler et al. |
| 2004/0046376 A1 | 3/2004 | Ryan |
| 2004/0188991 A1 | 9/2004 | Schneider et al. |
| 2004/0212187 A1 | 10/2004 | Kai |
| 2005/0023811 A1 | 2/2005 | Thomas |
| 2005/0057030 A1 | 3/2005 | Fischer et al. |
| 2005/0062270 A1 | 3/2005 | Kai |

FOREIGN PATENT DOCUMENTS

| | | |
|---|---|---|
| JP | 2004-314738 A | 11/2004 |

OTHER PUBLICATIONS

Thomas, Scott D. and Hawthorn, Laura A., "Dual Depth Passenger Air Bag", Sae Technical Paper Series, 2005, 29 pgs.

* cited by examiner

Fig. 3
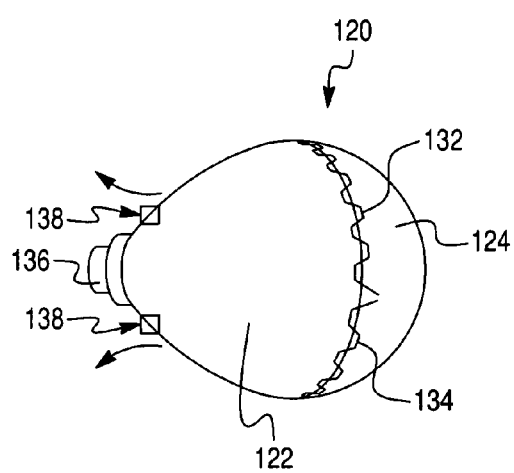
Fig. 4
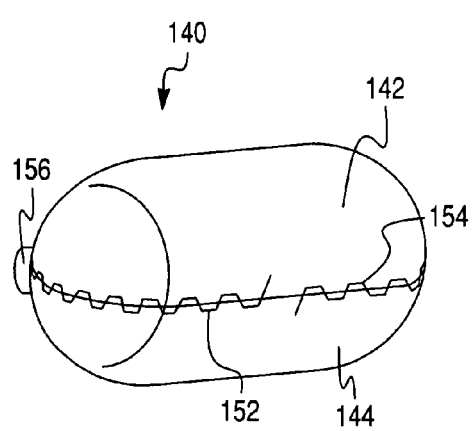
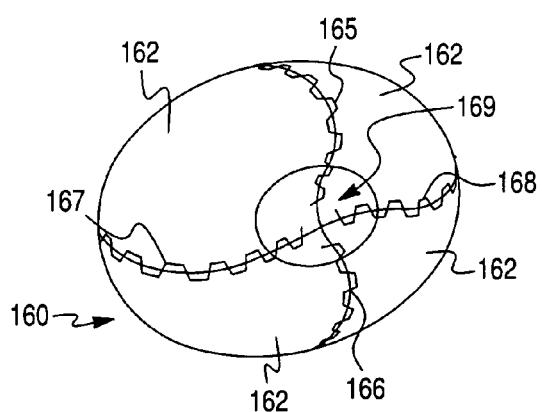
Fig. 5a
Fig. 5b
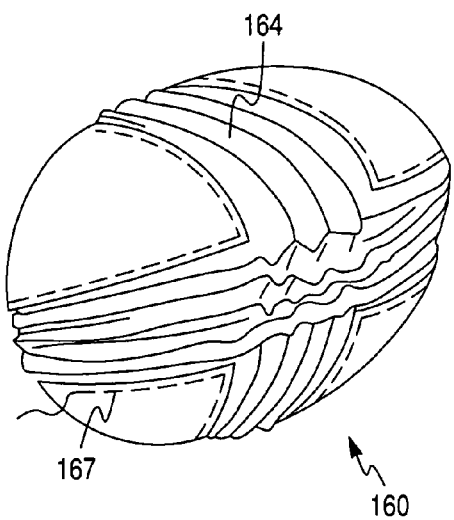

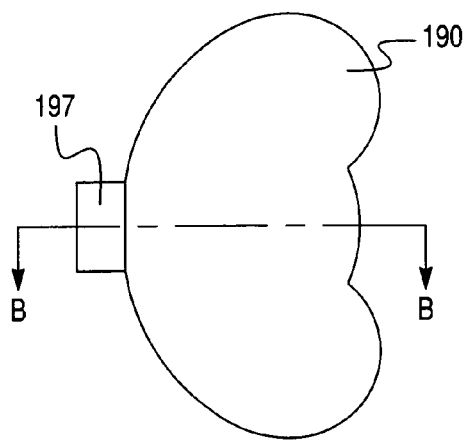
Fig. 8a
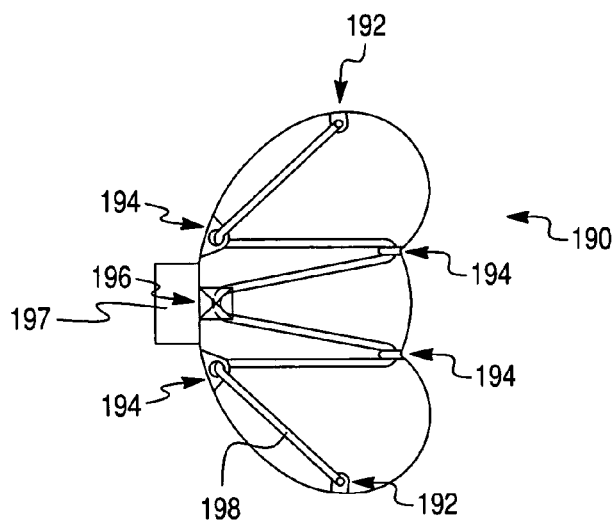
Fig. 8b
Fig. 9
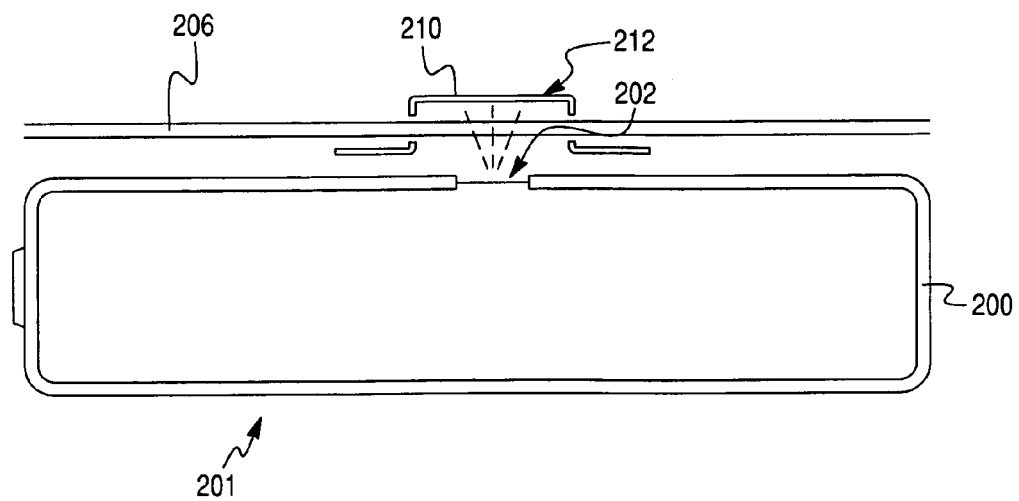

ADAPTIVE DEPTH AIRBAG

CROSS-REFERENCE TO RELATED PATENT APPLICATIONS

This application claims the benefit, under 35 U.S.C. 119(e), of U.S. application Ser. No. 60/678,193, filed May 6, 2005, which is incorporated herein by reference in its entirety.

BACKGROUND

The present invention relates generally to the field of airbag cushions that can be deployed in two different volumes or shapes.

Airbags can inflate into different volumes. Conventionally, airbags with dual-volumes incorporate tethers. The tethers initially restrict the airbag cushion to a particular volume that is relatively smaller than the full volume that the airbag cushion is capable of achieving. The tether anchors are released by an electro-mechanical or electronically triggered pyro-mechanical control device in order to inflate the airbag cushion to the full volume.

Conventionally, a movable vent mechanism is incorporated into the airbags with tethers. Sliding pins or clamps are often included in the tether release mechanism to hold the tether in position in "small bag" mode and to release the airbag when transitioning into "large bag" mode. This release mechanism is commonly associated with a mechanical gas vent in the open position to release a portion of the generated gas into the surrounding space rather than into the airbag to allow for a reduced pressure in the "small bag" condition. This vent is closed to make a higher pressure when the tether anchors are released in the "large bag" mode. In the default condition, the airbag is in the "small bag" mode. The default condition is "small bag" mode because it is easier to release a pin or clamp on the tether than to catch a released tether after the airbag cushion begins to inflate.

SUMMARY

One embodiment of the invention relates to airbag device. The airbag device comprises an airbag formed with at least one fabric panel; the fabric panel including an opening along a perimeter of the fabric panel; a dual stage inflator configured to generate inflation gas in a first inflation stage and a second inflation stage to inflate the airbag; and a tether configured to control the shape of the airbag when the airbag is inflating. The tether is positioned through the opening when the airbag is in an uninflated state. The tether is configured to be severed by heat and/or pressure from inflation gases during the second stage inflation.

Another embodiment of the present invention relates to an airbag device. The airbag device comprises an airbag formed with a fabric panel; the fabric panel including a plurality of openings along a perimeter of the fabric panel; a retainer; and a tether configured to help control the shape of the airbag during inflation, the tether being positioned through the openings when the airbag is in an uninflated state. A first end of the tether is connected to the airbag and a second end of the tether is connected to the retainer. The tether is configured to be severed, and when the tether is severed, the first end remains connected to the airbag and the second end of the tether remains connected to the retainer.

Another embodiment of the present invention relates to an airbag device. The airbag device comprises an airbag formed with at least one fabric panel; an inflator configured to generate inflation gas; a retainer; and a tether configured to control the shape of the airbag when the airbag is inflating. The tether is positioned adjacent a gas outlet port of the inflator. The tether is configured to be severed by heat and/or pressure from inflation gases during inflation.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(a) shows the airbag in "small bag" mode. FIG. 1(b) shows the airbag in "large bag" mode.

FIG. 3 is a perspective view of an airbag according to another embodiment of the present invention in which the airbag includes two external tethers in a vertical configuration.

FIG. 4 is a perspective view of an airbag according to another embodiment of the present invention in which the airbag includes two external tethers in a horizontal configuration.

FIGS. 5(a) and 5(b) are perspective views of an airbag with a multipart external tether configuration according to another embodiment of the present invention. FIG. 5(a) shows the airbag in "small bag" mode. FIG. 5(b) shows the airbag in "large bag" mode.

FIG. 6(a) shows the airbag in "small bag" mode. FIG. 6(b) shows the airbag in "large bag" mode.

FIG. 7(a) is a side view of the airbag. FIG. 7(b) is a cross-sectional view of the airbag taken along line A-A in FIG. 7(a).

FIGS. 8(a) and 8(b) are views of a driver-side airbag according to another embodiment of the present invention. FIG. 8(a) is a side view of the airbag. FIG. 8(b) is a cross-sectional view of the airbag taken along line B-B in FIG. 8(a).

FIG. 9 is a detail view of a release mechanism according to another embodiment of the present invention.

FIG. 20(a) is a side view of the airbag. FIG. 20(b) is a cross-sectional view of the airbag taken along line C-C of FIG. 20(a).

DETAILED DESCRIPTION

Figure 1A:
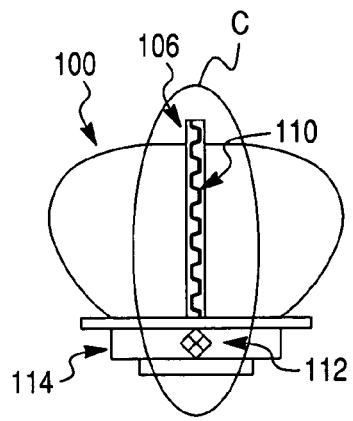
FIGS. 1(a) and 1(b) are top views of an airbag according to an embodiment of the present invention.

Conventional dual-volume airbags have several problems. The tethers in the conventional airbags are sewn into the cushion assembly and make use of metal rings and hook-like devices to attach to the release mechanism. Such integral straps and hook/ring assemblies add to the cost of the cushion assembly. Additionally, such integral tethers must have enough tensile strength to restrain the cushion directly against the force of a large single stage inflator. This makes the tether's weight and cost significant. In addition, such conventional dual-volume airbags do not reliably release the tethers. The tethers can snag, release too late or release too soon requiring special technical countermeasures and manufacturing practices to prevent problems.

An airbag cushion with tethers may include an airbag cushion of any configuration. The airbag cushion can be a driver or passenger airbag, a side airbag, a new concept passenger module (NCPM) or new concept driver module (NCDM), intermediate seating, inter-seat bags, or any other type of airbag cushion. The airbag cushion can also be of asymmetrical design. The tether or a plurality of tethers can be applied inside or outside of any airbag configuration.

The airbag cushion is configured with a zone or section that may be kept folded during deployment resulting in a "small mode" inflated size or the zone/section can be unfolded and released during deployment resulting in a "large mode" inflated size. On either side of the folded or stored section, the airbag cushion is equipped with two or more fabric selvages. The selvage can include flanges that are extensions of the selvage required to maintain the stability of major structural sew lines connecting any airbag panels. The selvages can be either an integral part or an extension of the basic airbag panels. These selvages are provided with a series of holes spaced in such a way that a tether may be woven through designated slots, eyelets or loops in the alternate flanges or locally extended selvage material at the edge of the panels, similar to a lacing a shoestring through eyelets of a shoe. If the end of the tether is locked during airbag cushion deployment, the tether will prevent the selvages from separating and the cushion will remain restricted to a small volume configuration. If the end of the tether is unlocked, the tether will pull out of the holes. The cushion will then be allowed to expand to the full, "large size" volume.

The tether can be severed by a release mechanism. The release mechanism can unlock or sever the tether by cutting, unclamping, burning, incorporating a weakened area that breaks under a specified load, or any other suitable mechanism. The airbag cushion can be controlled by direct pyrotechnic cutting or burning of the tether in addition to or separate from any other suitable form of mechanical release mechanism that severs the tether. The severing can also be accomplished by hot and/or a high pressure fluid jet from the high output stage of an inflator. A single release mechanism can be used or a plurality of release mechanisms. In addition, each single release mechanism can release a plurality of tethers.

A plurality of tethers can be used and each tether can be locked differently such that the airbag cushion can be inflated in a controlled asymmetrical manner. The airbag cushion can be steered based upon inputs from an electrical control unit. In some embodiments, the release mechanism can be controlled in time to create airbag cushions of different effective volumes based upon the length of time the tether is released or on the airbag cushion's or tether's released length.

Embodiments of the present invention will be described below with reference to the drawings.

Figure 1B:
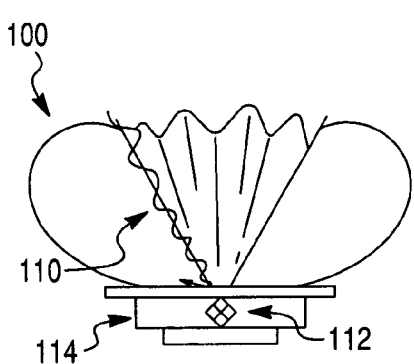
Figure 2:
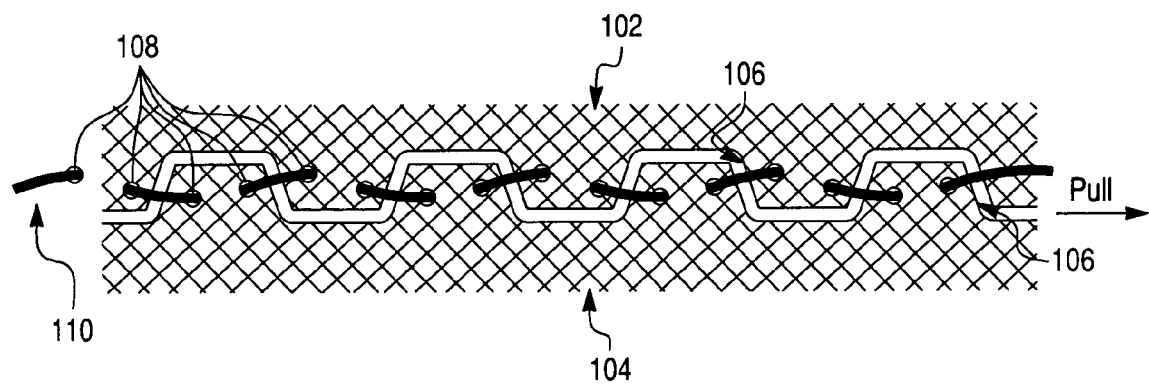
FIG. 2 is a detail view at C of the airbag of FIG. 1(a).

FIGS. 1(a)-2 show an embodiment of an airbag cushion 100 according to the invention. The airbag cushion 100 includes a first fabric half 102 and a second fabric half 104. The first fabric half 102 and second fabric half 104 are joined along a selvage section 106 along ends of the first 102 and second 104 fabric halves. A tether 110 is threaded through openings 108 in the selvage 106, as shown in FIG. 2. One end of the tether 110 is directly or indirectly attached to a housing 114 of the airbag cushion 100, the airbag cushion 100 itself, or a release mechanism 112. A second end of the tether 110 can be directly or indirectly attached to the housing 114, the airbag cushion 100, release mechanism 112, or tied or knotted at the second end.

When the airbag cushion 100 is deployed, the airbag cushion 100 inflates initially into a "small size" mode, as shown in FIG. 1(a). The airbag cushion 100 can remain in the "small size" mode if a control device, such as an electrical control unit (ECU) determines that the tether 110 should not be released. However, if a control device determines that the airbag cushion 100 should further inflate into "large size", as shown in FIG. 1(b), and then the release mechanism 112 releases the tether. The release of the tether 110 allows the selvage 106 of the first 102 and second 104 fabric halves to pull apart, thus allowing the airbag cushion 100 to inflate further. As the selvages 106 separate, the remaining folded portions of the airbag cushion 100 expand. The airbag cushion 100 does not necessarily require a control unit to determine if the tether 110 should be released. Rather, the tether 110 can automatically be released after the initial inflation of the airbag cushion, thus delaying the airbag cushion's full inflation.

FIG. 3 shows another embodiment of an airbag cushion 120. The airbag cushion 120 can comprise a first fabric half 122 and a second fabric half 124. A first tether 132 can extend over the top of the airbag cushion 120 in a vertical direction. A second tether 134 can extend over the bottom of the airbag cushion 120 in a vertical direction and meet with or end adjacent to an end of the first tether 132. The airbag cushion 120 can include two release mechanisms 138 on either side of a housing 136. When the release mechanisms 138 release the first 132 and second 134 tethers, the airbag cushion 120 can further expand into a "large size" configuration.

FIG. 4 shows an airbag cushion 140 according to another embodiment of the present invention. The airbag cushion 140 includes a first fabric half 142 and a second fabric half 144. A first tether 152 and second tether 154 join the selvage sections of the first 142 and second 144 fabric halves such that the airbag cushion 140 deploys into the "small size" mode. The tethers 152, 154 can be released by a release mechanism (not shown) which can be situated near the housing 156. The tethers 152, 154 extend around the airbag cushion 140 in a horizontal fashion. When the release mechanism releases the tethers 152, 154, the airbag cushion 140 expands into a "large size" configuration.

FIGS. 5(a) and 5(b) show another embodiment of an airbag cushion 160. The airbag cushion 160 comprises fabric sections 162. The fabric sections 162 can be joined by multiple tethers. FIG. 5(a) shows a first tether 165 extending vertically over the top of the airbag cushion 160 and ending at a joining region 169. A second tether 166 extends vertically over the bottom of the airbag cushion 160 and ends at the joining region 169. Further, third 167 and fourth 168 tethers extend horizontally around the airbag cushion 160 and end at the joining region 169. When the airbag cushion 160 initially inflates into the "small size," as shown in FIG. 5(a), the tethers 165, 166, 167, 168 constrain the selvage sections of the fabric sections 162. When a release mechanism (or multiple release mechanisms) releases the tethers 165, 166, 167, 168, the airbag cushion 160 expands by the unfolding of the folded sections 164, thus moving the airbag cushion into the "large size" configuration. FIG. 5(b) shows the airbag cushion 160 in the "large size" configuration.

Figure 6A:
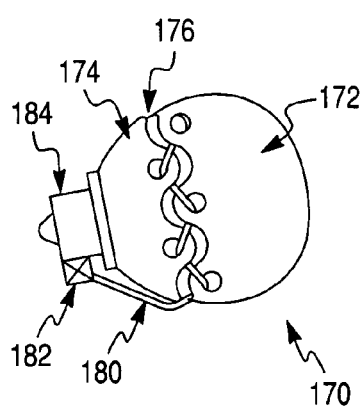
FIGS. 6(a) and 6(b) are side views of an airbag with annular expansion folds and an external tether according to another embodiment of the present invention.
Figure 6B:
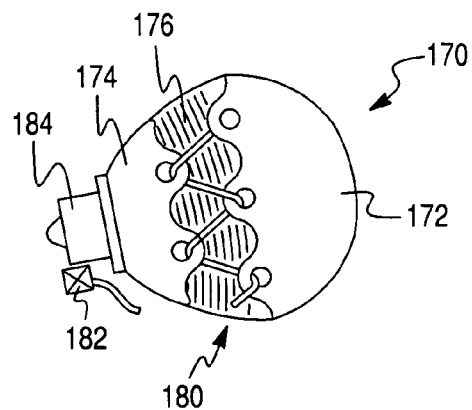

FIGS. 6(a) and 6(b) show another embodiment of the present invention. FIG. 6(a) shows an airbag cushion 170 in the "small size" configuration. The airbag cushion 170 is attached to housing 184 and includes a front panel 172 and a rear panel 174. The airbag cushion 170 includes an accordion-folded zone 176. A tether 180 threads together the selvage sections of the front 172 and rear 174 panels, keeping the accordion section 176 folded. The tether 180 is threaded the panels 172, 174 and connects directly or indirectly to a release mechanism 182. When the release mechanism 182 releases the tether 180, the front 172 and rear 174 panels begin to separate, allowing the accordion section 176 to expand. The airbag cushion 170 then inflates to the full "large size" configuration, as shown in FIG. 6(b).

Figure 7A:
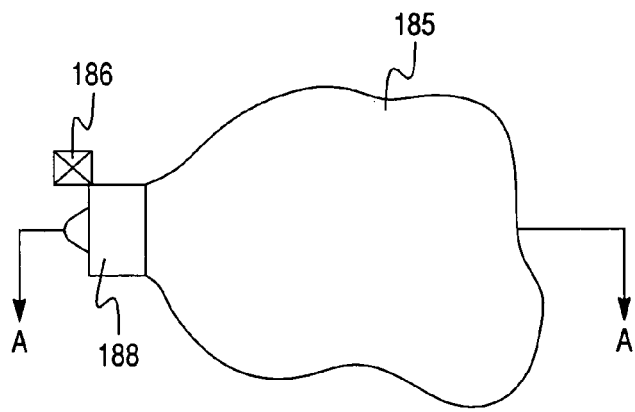
FIGS. 7(a) and 7(b) are views of an airbag with internal release tether according to another embodiment of the present invention.
Figure 7B:
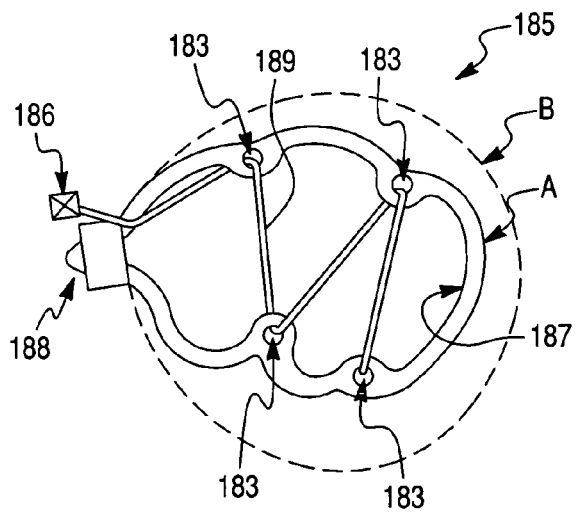

FIGS. 7(a) and 7(b) show another embodiment of an airbag cushion 185 of the present invention in which the airbag cushion 185 is attached to a housing 188. The airbag cushion 185 includes an internal tether or tether 189. The internal tether 189 is looped through openings 183 in the internal selvage sections 187. An end of the tether 189 is directly or indirectly connected to a release mechanism 186. When the tether 189 is connected, the airbag cushion 185 inflates up to the solid line A (restrained or "small size"). When the tether 189 is released, the airbag cushion 185 inflates to the "large size" configuration, as shown by the dotted line B (released, fully open position).

FIGS. 8(a) and 8(b) show another embodiment of an airbag cushion 190 that is attached to a housing 197. The airbag cushion 190 is a new concept driver module (NCDM) or twin-type airbag. The airbag cushion 190 includes an internal tether or tether 198. The tether 198 is connected at two ends by anchors 192. The tether 198 also loops through openings or loops 194 inside the airbag cushion 190 to constrain the airbag cushion 190. When the release mechanism 196 releases the tether 198, the airbag cushion 190 can expand into full "large size" configuration.

Figure 10:
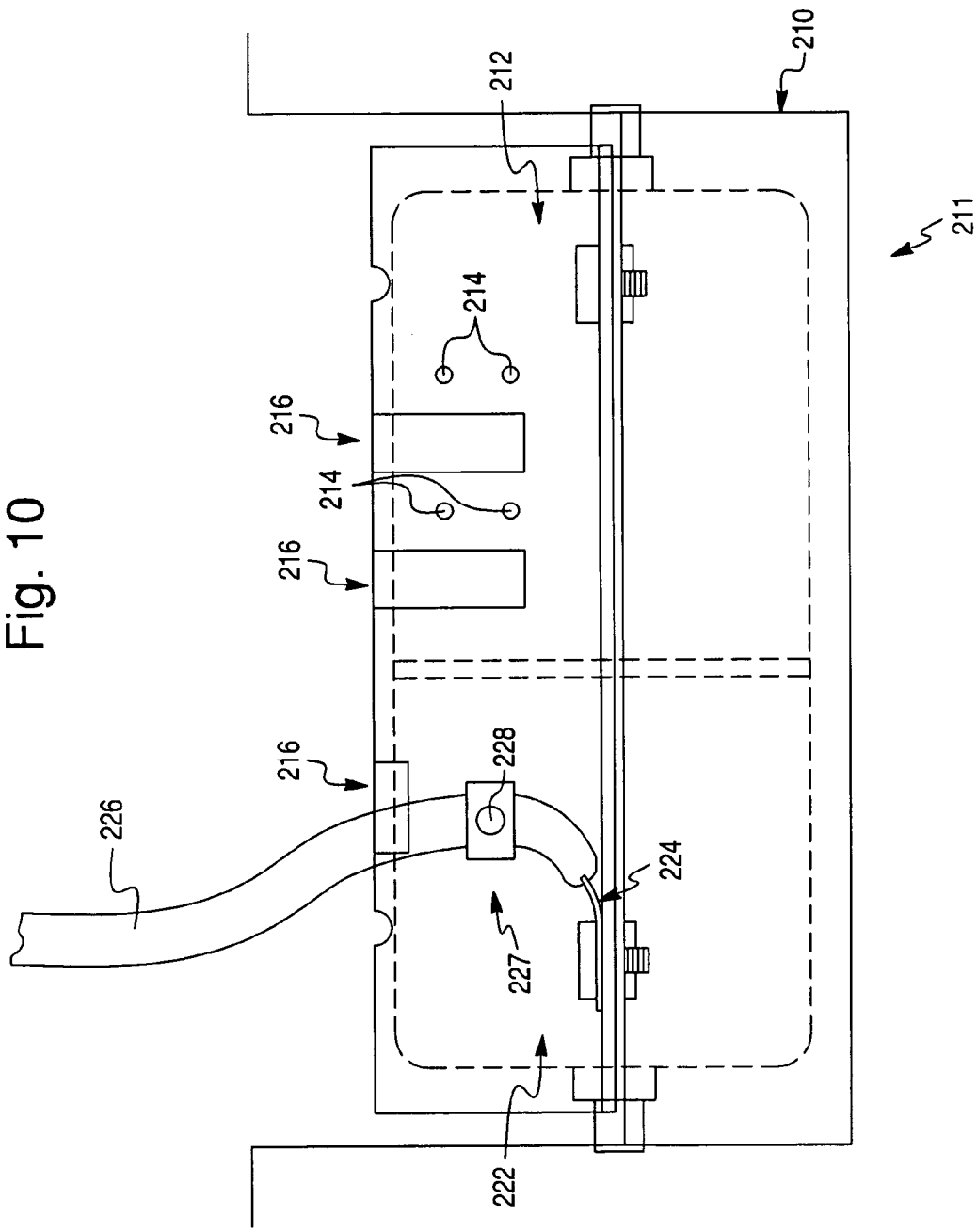
FIG. 10 is a detail view of a release mechanism with a second stage inflator according to another embodiment of the present invention.

FIGS. 9 and 10 show different embodiments of a release mechanism for a dual stage airbag. FIG. 9 shows an embodiment in which a tether 206 is connected to the release mechanism 201 in between a body element 212 of a retainer 210 or housing. An output port 202 of an inflator 200 is adjacent the tether 206. When the inflator 200 begins sending out jets of inflation gas, the gas hits the tether 206. The pressure, force and/or heat from the gas breaks the tether 206, thus severing the tether 206.

FIG. 10 shows an alternative embodiment of a release mechanism 211 in which the inflator is a dual stage inflator. The first stage inflator 212 includes primary inflator output ports 214 for deploying an airbag cushion. The first stage inflator 212 includes retainer gas passages 216. The second stage inflator 222 also includes retainer gas passages 216. A tether 226 is anchored to the inflator or housing 210 at anchor 224. The anchor 224 includes a stud 224 which connects through a hole (not shown) in the tether 226. The tether 226 passes over the second stage inflator output port 228. The tether 226 passes through a loop 227 in a diffuser, which holds the tether 226 over the output port 228. When the second stage inflator 222 begins deploying inflation gases, the gases exit through the output port 228, hitting and breaking (severing) the tether 226 at the portion of the tether 226 over the output port 228. A portion of the tether 226 still remains held by the anchor 224 after the tether 226 is severed. The tether breaks by melting or cutting away due to the heat and/or high pressure of the inflation gases. This action releases the tether 226 and allows an airbag cushion to deploy into "large size" configuration.

The tether in the airbag is not required to directly restrain the airbag cushion against the full output loads of an inflator. Rather, the tether works indirectly and is only required to restrain the internal or external selvages/selvage edges against separation. The selvages or selvage edges of the airbag cushion carry the inflator output loads.

Figure 11:
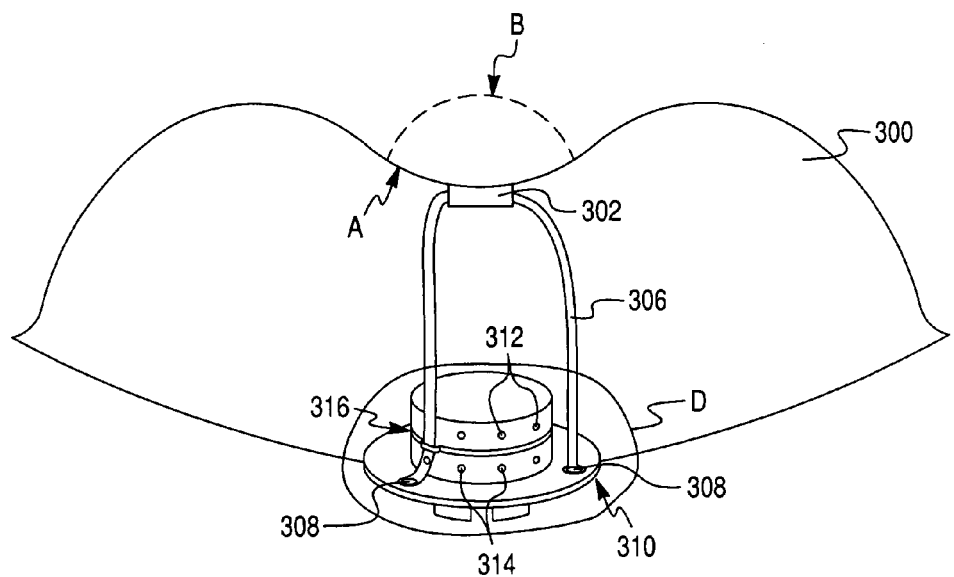
FIG. 11 is a view of an airbag with an internal tether positioned through an internal loop along the perimeter of the airbag according to another embodiment of the present invention.
Figure 12:
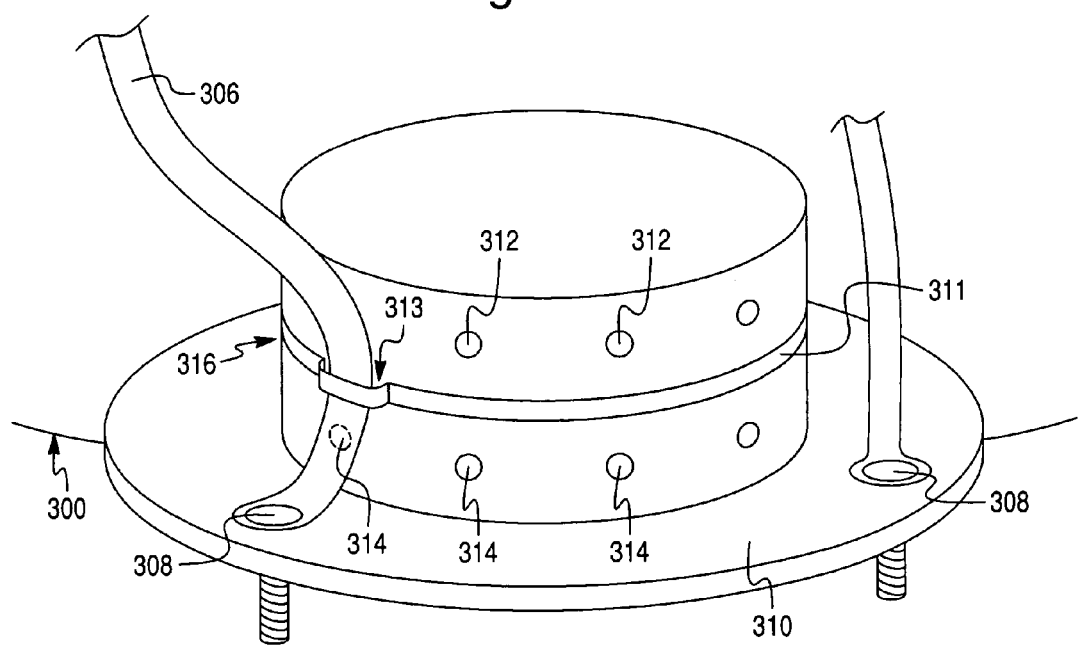
FIG. 12 is a detail view of the airbag of FIG. 11 at D.

FIGS. 11 and 12 show a driver side airbag 300 with a severable, internal tether 306 according to another embodiment of the present invention. The airbag 300 is operably connected to an inflator 310 and is formed with at least one fabric panel. The inflator 310 is a dual stage inflator 310 with primary 312 and secondary 314 outlet ports. A tether 306 is anchored to the inflator 310 on both ends by studs 308. The studs 308 can be fitted through an opening of the tether 306. The tether can be connected to the inflator by any other suitable mechanism for connecting the tether 306. For example, a nut (not shown) can be attached to a stud after a retainer is installed in an airbag housing. Alternatively, the connection can be by sewn stitches, adhesives, a D-ring, a grommet. The tether 306 loops though a loop 302 along the internal perimeter of the airbag 300.

When the airbag 300 initially inflates during the first stage of the inflator 310, inflation gases are emitted from the primary outlet ports 312, expanding the airbag to a first restrained position A. When the dual stage inflator 310 emits gases during the second stage, gases are emitted through the secondary outlet ports 314. A portion of the tether 306 is positioned adjacent the secondary outlet ports 314 and held in position by the release mechanism 316. The heat from the inflation gases of the second stage inflation melt, or sever the tether adjacent the secondary outlet ports 314, thus allowing the tether 306 to be removed or released from the loop 302, or the tautness or pull of the tether 306 to be lessened. When the tether 306 is severed, the airbag 300 is able to expand to a fully open position B.

The release mechanism 316, as shown in detail in FIG. 12, includes a retainer band 311. The retainer band 311 is connected to the inflator 310 and surrounds a portion of the inflator 310. The retainer band 311 includes a tether opening 313, which is configured to allow the tether 306 to be positioned between the retainer band 311 and the inflator 310, adjacent the secondary outlet ports 314. After the tether 306 is severed, the ends of the tether 306 remain connected to the inflator 310 at the studs 308. However, it will be recognized that after severing, the tether 306 could be released or removed at one or both of the studs 308.

Figure 13:
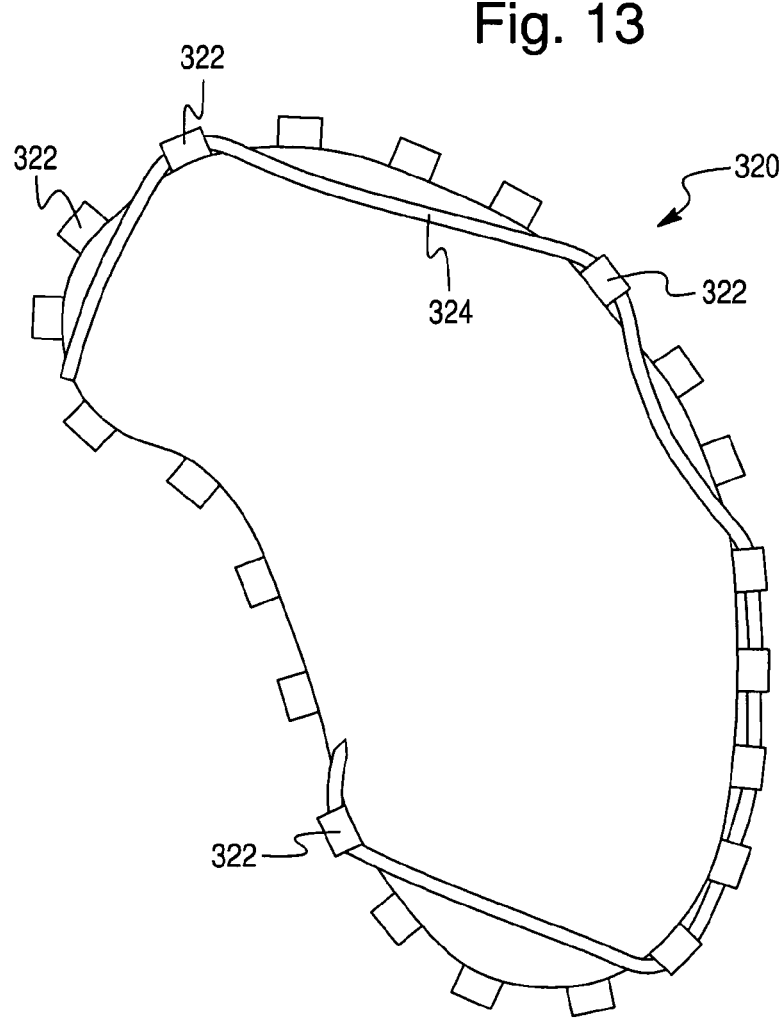
FIG. 13 is a perspective view of an airbag turned inside out with an internal tether positioned through a plurality of internal loops according to another embodiment of the present invention.
Figure 14:
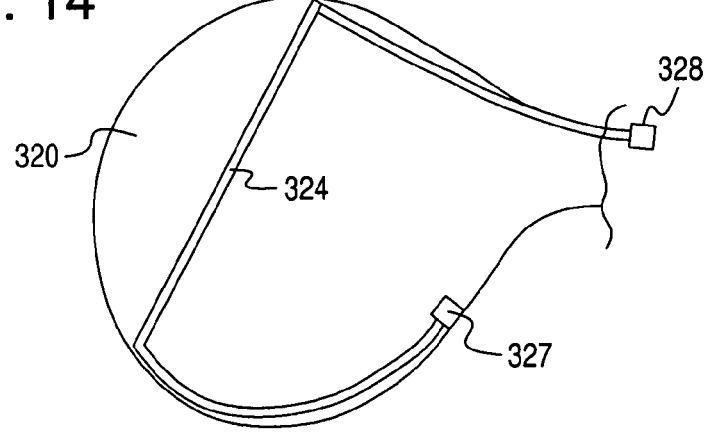
FIG. 14 is a side view of the airbag of FIG. 13 during inflation and showing exemplary attachment points of the tether.

FIGS. 13 and 14 show a passenger airbag 320 according to another embodiment of the present invention. The airbag 320 contains a plurality of loops 322 along the perimeter of the airbag fabric panel 320. A tether 324 is operably connected at a first end to a retainer (not shown). A second end of the tether 324 is connected to the airbag 320, which is at a perimeter of the airbag 320. The tether, for example, can be connected by stitched seams, a ring, grommet, a key chain type loop, a D-ring attachment, or any other suitable mechanism. As can be seen in FIG. 13, the tether 324 is looped through eight loops 322 along the perimeter of the airbag 320. However, any other number of loops 322 can be used. For example, just one loop 322 may be used or any other greater amount. In addition, The specific choice of loop 322 positioning along the perimeter will vary depending on the type of airbag 320 being used.

FIG. 14 shows a side view of the airbag 320. In this view, exemplary first 327 and second 328 connection points are shown for the tether 324. As can be seen, the first connection point 327 is on the perimeter of the airbag 320. The second connection point 328 is at the retainer (not shown).

Figure 15:
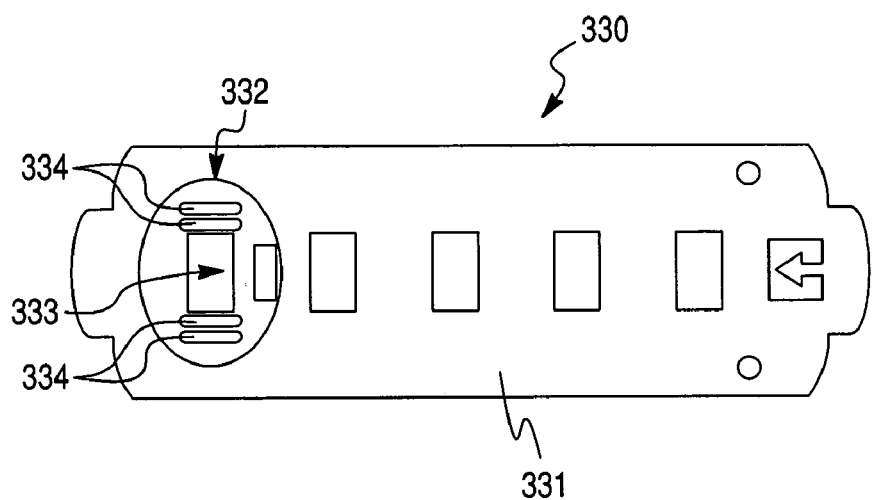
FIG. 15 is a top plan view of a retainer.

FIGS. 15-18 show a release mechanism 330 according to an embodiment of the present invention. This release mechanism 330 can be used in conjunction with the embodiment shown in FIGS. 13-14, or any other embodiment. FIG. 15 shows a view of a retainer 331. The retainer 331 includes a holding section 332 that holds or positions the tether 324 adjacent the secondary outlet port 314 of the dual stage inflator 310 (as shown in FIG. 12). The release mechanism 330 is similar to that in FIG. 12 such that the tether 324 is severed by the hot inflation gases during the second stage of inflation. During the first stage of inflation, the tether 324 remains unchanged, but during the second stage of inflation, the tether 324 is severed by the hot gases. The tether 324 can either be positioned away from the primary outlet ports 312 by the release mechanism 330, or can be designed of a heat sensitive material such that it will not be affected by the initial, low-output gases, but will melt, burn or sever during the second, high-output stage.

Figure 16:
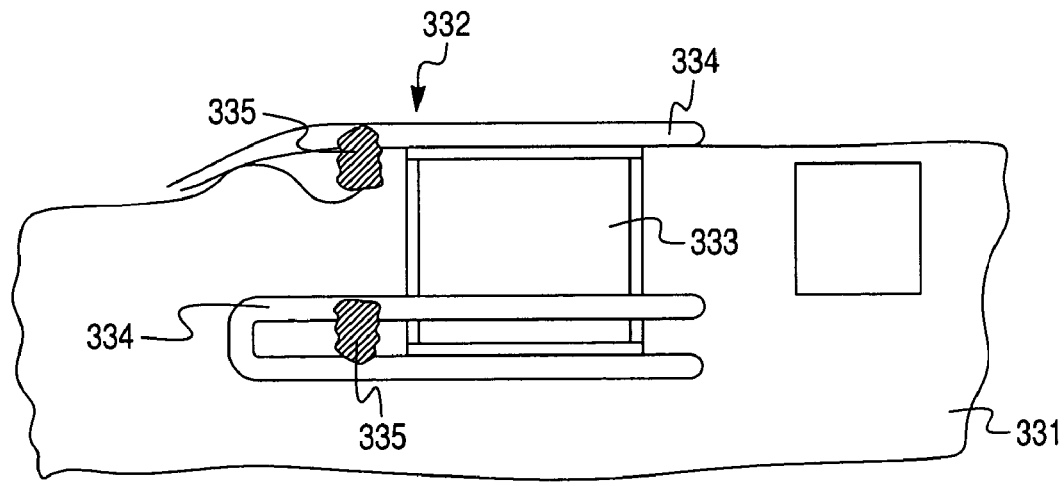
FIG. 16 is a detail perspective view of a holding section of the retainer of FIG. 15.
Figure 17:
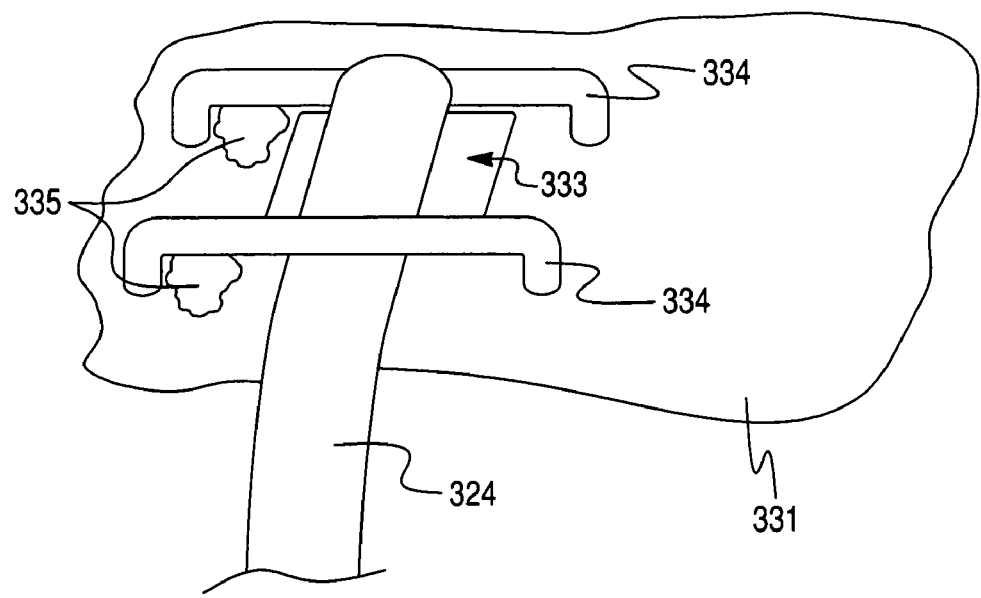
FIG. 17 is a detail perspective view of the holding section of the retainer of FIG. 16 showing the tether.
Figure 18:
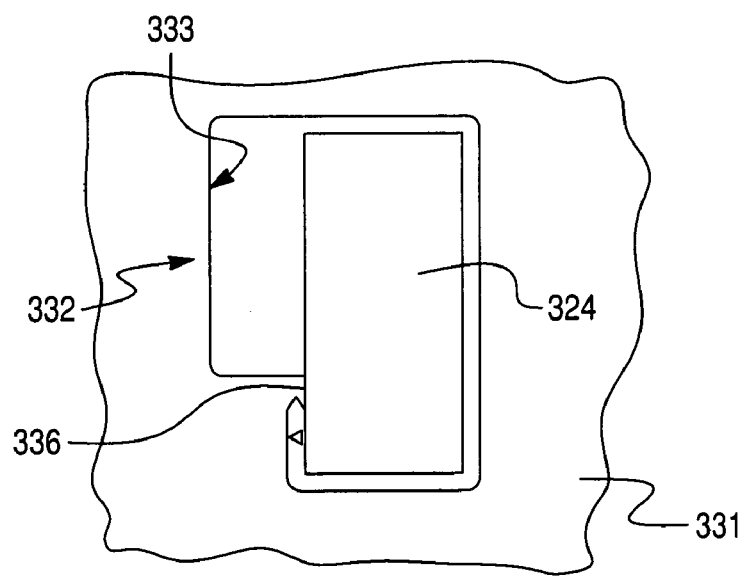
FIG. 18 is a detail rear view of the holding section of the retainer of FIG. 16 showing the tether.

The holding section 332 includes at least one rod 334. The rod or rods, as shown in FIG. 16, are positioned on either side of an opening 333 in the retainer 331. This opening 333 is configured to align with the secondary outlet port(s).314. The tether 324 is pulled through a second opening 336, pulled over a first set of rods 334, positioned over the opening 333 and pulled under a second set of rods 334. In addition, welds 335 can be added between the rods 334 and the retainer 331 in order to prevent the tether 324 from sliding around in the release mechanism 330 and help keep the tether 324 directly over the secondary gas outlet 314. The welds 335 can be added in any suitable position or amount.

The retainer 331 and release mechanism 330 should be designed such that there are no sharp edges and there is a smooth transition for the tether 324 to ensure that the tether 324 does not tear. Further, the tether 324 can include a reinforced area 382. This reinforced area 382 has the tether 324 folded over itself to form multiple layers. For example, the tether 324 can have four layers or any other suitable amount. The reinforced area 382 can be formed by folding an end of the tether 324 over onto itself and then folding the tether 324 in half lengthwise again.

Figure 19:
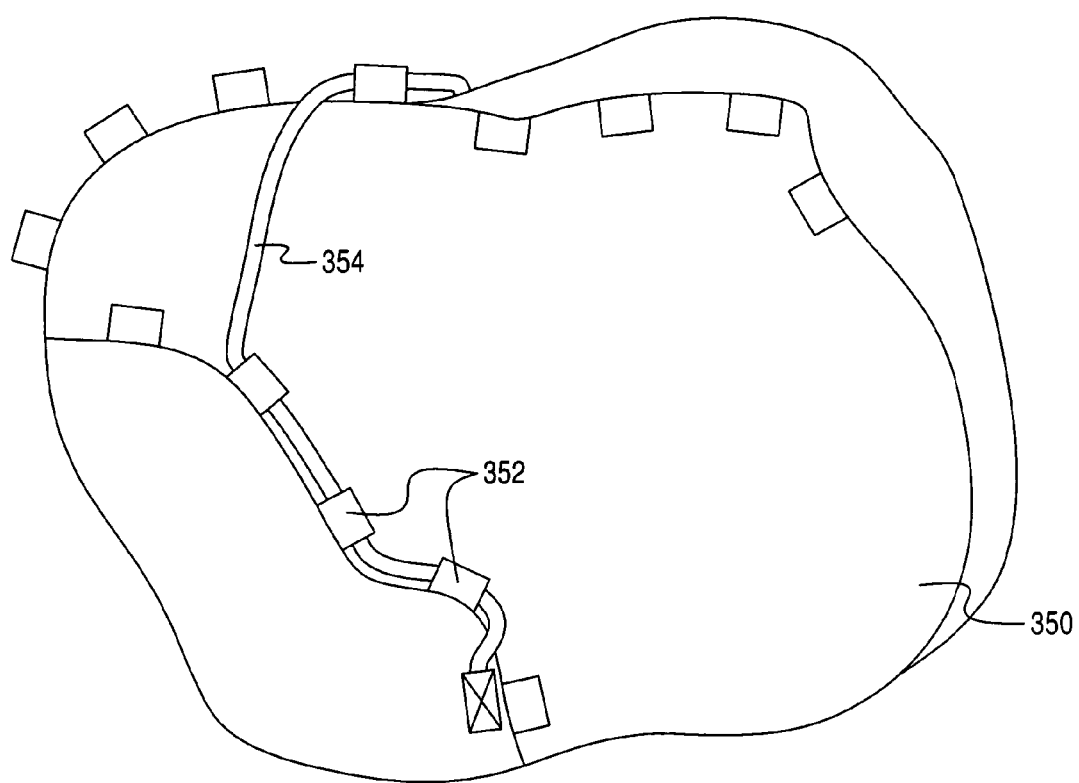
FIG. 19 is a perspective view of an airbag turned inside out with a tether according to another embodiment of the present invention.

According to another embodiment, an airbag 350 can include a variety of loop-tether connections. For example, as shown in FIG. 19, the tether 354 can be looped through loops 352 opposite from each other along the internal perimeter of the airbag 350. Of course, any number of loops 352 (one or more) can be used and any number of tethers 354 can be used in combination.

Figure 20A:
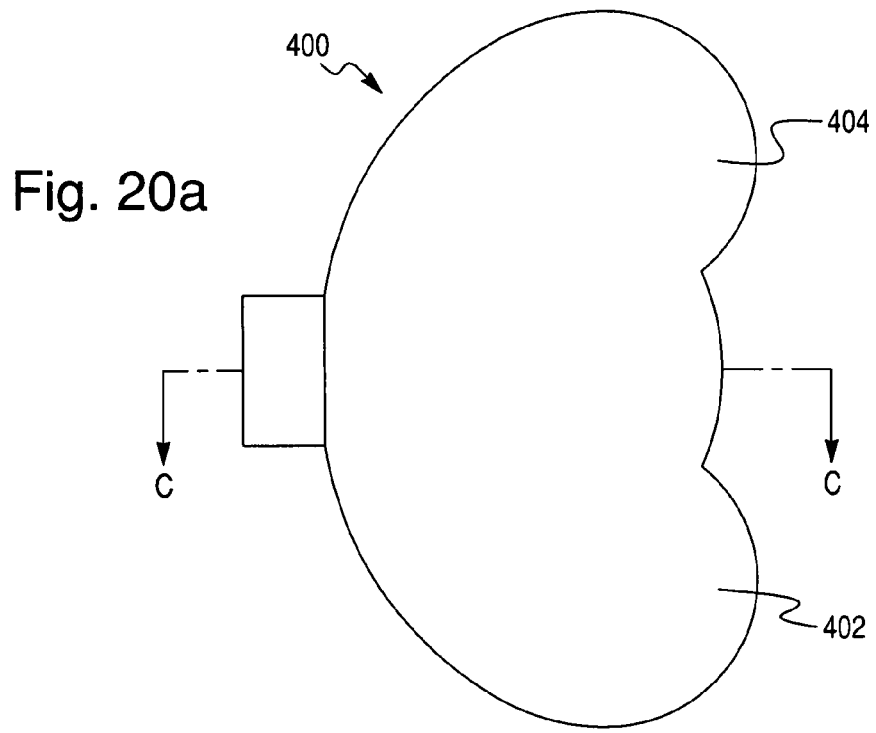
FIGS. 20(a) and 20(b) are views of a twin airbag according to another embodiment of the present invention.
Figure 20B:
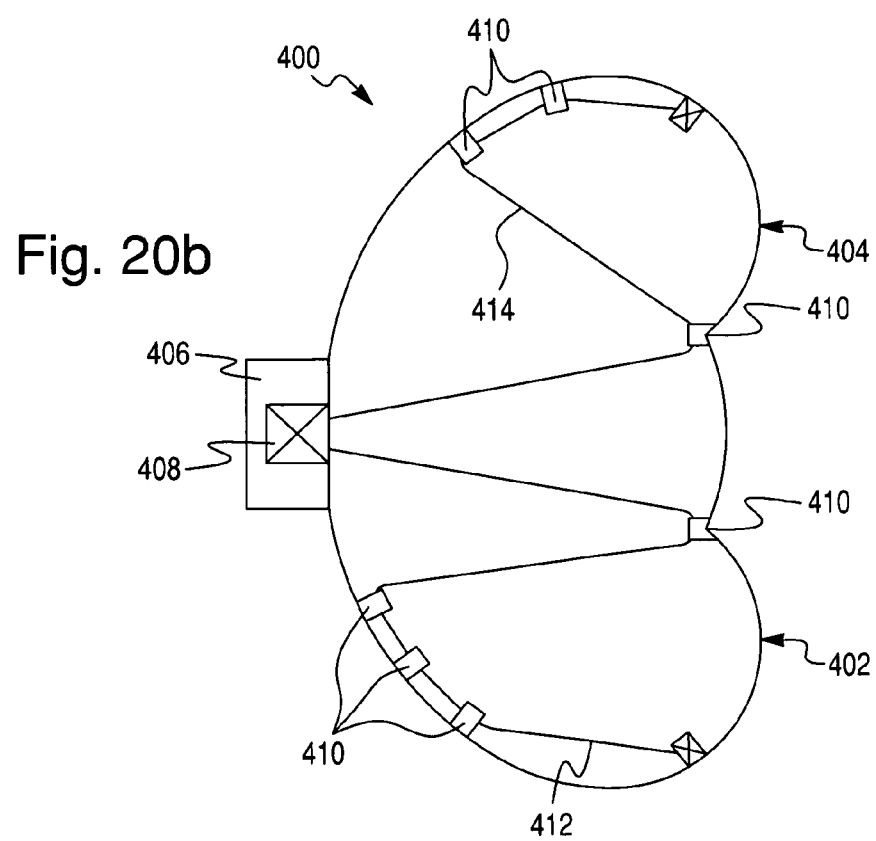

FIGS. 20(a) and 20(b) show another embodiment of an airbag cushion 400 that is attached to a housing 406. The airbag cushion 400 is a twin-type airbag with a first lobe 402 and a second lobe 404. The airbag cushion 400 includes at least two internal tethers or tethers; a first tether 412 and a second tether 414. The first tether 412 is connected at one end to the airbag 400. The tether 412 loops through openings or loops 410 inside the airbag cushion 400 to constrain the airbag cushion 400. Any suitable number or positioning of loops can be used. For example, two loops 410 are shown, but fewer or additional loops 410 can be used. The tether 412 is connected at another end to a housing 406 and operably connected to a release mechanism 408. When the release mechanism 408 releases the tether 412, the first lobe 402 of the airbag cushion 400 can expand into full "large size" configuration. Similarly, a second tether 414 can be used in the second lobe 404. The second tether 414 has one end connected to the airbag 400. The second tether 414 is looped through loops 410 and then connected to the housing 406 and operably connected to the release mechanism 408. When the release mechanism 408 releases the second tether 414, the second lobe 404 can expand into the full "large size" configuration. The connections of the tethers 412 and 414 can be by sewn seams, grommets, D-rings, adhesive or other appropriate mechanisms to connect the tethers 412, 414 to the airbag cushion 400.

Figure 21:
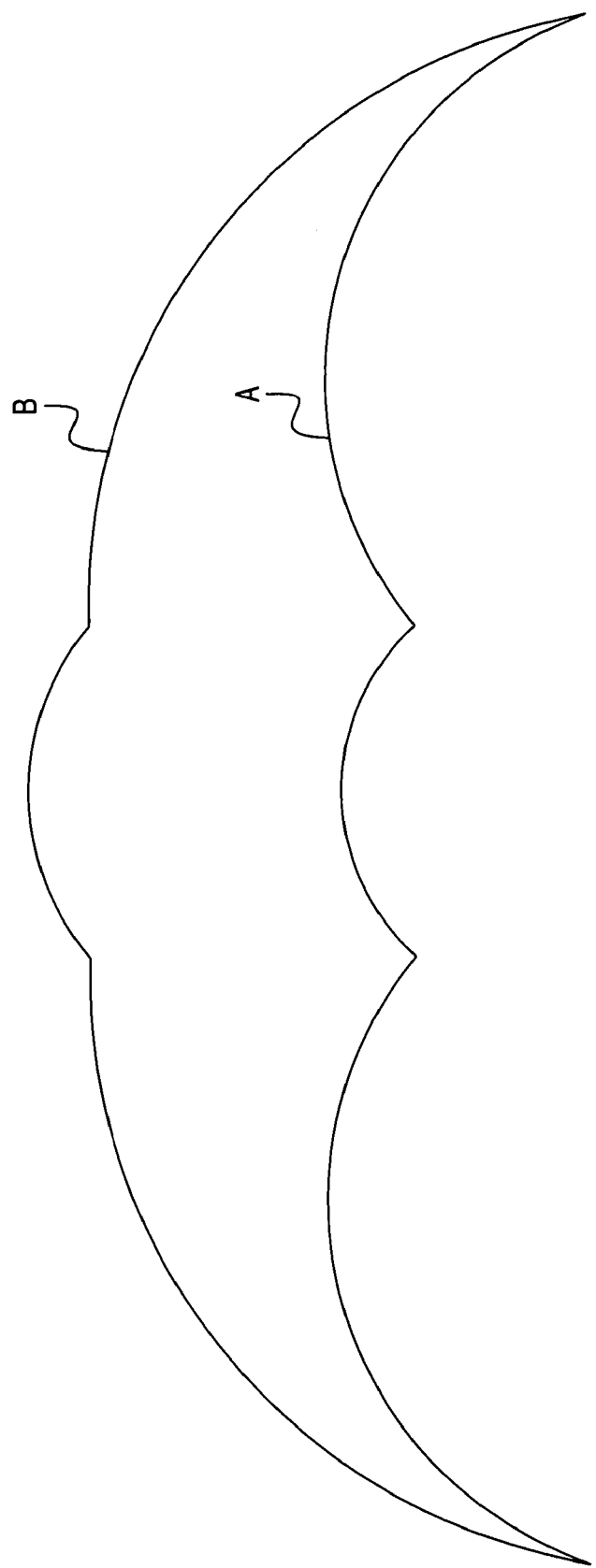
FIG. 21 is a graphical representation of the surface depth profile of a restrained airbag versus an unrestrained airbag.

FIG. 21 shows the surface depth profile of a restrained airbag versus an unrestrained airbag. The first profile, shown at A, discloses an airbag at a restrained depth. The second profile, shown at B, discloses the depth of an airbag after a tether is severed. This dual depth relationship for an airbag can have benefits for an out of position (OOP) occupant. An OOP occupant is often sitting very near the airbag device when a crash event occurs. When an airbag is in the retrained position A, an OOP occupant will less likely be injured by the forces from the airbag. When an airbag moves into the fully open position B, the high output and depth of an airbag can have benefits for a large occupant.

The term "tether" is being used generically. Tether may refer to a string, strap, wire, tether, rope, belt, tape, thread, cord, cable or any other suitable tensile element. The tether can loop over top or sides of an airbag cushion. The tether can form rosette patterns, radials, or any other suitable pattern or configuration. The tether can be comprised of one single piece or have multiple part configurations.

The tether or tether can be made of nylon rope, fishing line, a shoe-position type material or comprise a hollow interior. The tether could comprise ¼ inch polyester webbing. The tether or tether can comprise a heat sensitive material that allows the tether to burn, cut, melt or be severed from the heat of the secondary stage inflator. The tether can comprise a uniform material. The tether can be a material that is thin and slips easily through loops.

The inflator can be a Programmable Standard Passenger Inflator (PSPI) type inflator, a dual stage type inflator with one initiator for the primary stage gas outlet ports and an additional initiator for the secondary stage outlet ports, a dual stage type inflator with one initiator for both the primary and secondary stage gas outlet ports, or any other suitable type of dual level inflator. The airbag can be driver, passenger, side or other type.

While the invention is described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention. Furthermore, any combination of embodiments may be used. All references and publications cited herein are incorporated by reference in their entireties.

What is claimed is:

1. An airbag device, comprising:
    an airbag formed with at least one fabric panel; the fabric panel including a opening along a perimeter of the fabric panel;
    a dual stage inflator configured to generate inflation gas in a first inflation stage and a second inflation stage to inflate the airbag; and
    a tether configured to control the shape of the airbag when the airbag is inflating, the tether being positioned through the opening when the airbag is in an uninflated state,
    wherein the tether is configured to be severed by heat and/or pressure from inflation gases during the second stage inflation.

2. The airbag device of claim 1, further comprising a plurality of openings.

3. The airbag device of claim 1, wherein the opening is formed by a loop.

4. The airbag device of claim 1, wherein the opening is formed by an eyelet.

5. The airbag device of claim 1, wherein the opening is formed by a slot.

6. The airbag device of claim 1, further comprising a retainer, wherein prior to inflation of the airbag the tether is connected to the retainer adjacent a secondary stage gas port.

7. The airbag device of claim 6, wherein the retainer includes a holding section that includes at least one rod to maintain the position of the tether over the gas port of the inflator.

8. The airbag device of claim 1, wherein the opening is located on an interior portion of the airbag.

9. The airbag device of claim 1, wherein the opening is located on an exterior portion of the airbag.

10. The airbag device of claim 6, wherein the tether is configured so that a first end of the tether remains connected to the retainer after the tether severs.

11. The airbag device of claim 1, wherein the tether comprises a heat sensitive material configured to rupture when exposed to the heat of the inflation gas.

12. The airbag device of claim 1, wherein the tether includes a hollow core.

13. The airbag device of claim 1, further comprising a plurality of tethers.

14. The airbag device of claim 1, wherein the airbag comprises a twin cushion airbag with first and second lobes, and wherein each lobe includes a tether.

15. The airbag device of claim 1, wherein the material properties of the tether are substantially identical at every location of the tether.

16. The airbag device of claim 2, wherein the airbag includes a second fabric panel and the openings are located at an interface of first and second fabric panels.

17. An airbag device, comprising:
    an airbag formed with a fabric panel; the fabric panel including a plurality of openings along a perimeter of the fabric panel;
    a retainer; and
    a tether configured to help control the shape of the airbag during inflation, the tether being positioned through the openings when the airbag is in an uninflated state,
    wherein a first end of the tether is connected to the airbag and a second end of the tether is connected to the retainer, and
    wherein the tether is configured to be severed, and when the tether is severed, the first end remains connected to the airbag and the second end of the tether remains connected to the retainer.

18. An airbag device, comprising:
    an airbag formed with at least one fabric panel;
    a dual stage inflator configured to generate inflation gas;
    a retainer; and
    a tether configured to control the shape of the airbag when the airbag is inflating,
    wherein the tether is positioned adjacent a gas outlet port of the inflator,
    wherein the tether is configured to be severed by heat and/or pressure from inflation gases during inflation, and
    wherein the airbag includes an internal opening positioned alone a perimeter of a fabric panel, and wherein the tether is positioned through the opening.

19. The airbag device of claim 18, wherein the tether is positioned adjacent the gas outlet port of the second stage of inflation.

20. The airbag device of claim 18, wherein the tether is connected at a first end to an interior portion of the airbag.

21. The airbag device of claim 18, wherein the retainer includes a holding section that includes at least one rod to maintain the position of the tether over the gas outlet port of the inflator.

* * * * *